United States Patent
Becker et al.

(10) Patent No.: US 10,055,361 B2
(45) Date of Patent: Aug. 21, 2018

(54) MEMORY CONTROLLER FOR PROVIDING A PLURALITY OF DEFINED AREAS OF A MASS STORAGE MEDIUM AS INDEPENDENT MASS MEMORIES TO A MASTER OPERATING SYSTEM CORE FOR EXCLUSIVE PROVISION TO VIRTUAL MACHINES

(71) Applicant: CONTINENTAL AUTOMOTIVE GMBH, Hannover (DE)

(72) Inventors: Bernd Becker, Blaustein (DE); Thorsten Finke, Ehringshausen (DE)

(73) Assignee: Continental Automotive GmbH, Hannover (DE)

( * ) Notice: Subject to any disclaimer, the term of this patent is extended or adjusted under 35 U.S.C. 154(b) by 165 days.

(21) Appl. No.: 14/372,415

(22) PCT Filed: Jan. 25, 2013

(86) PCT No.: PCT/EP2013/051390
§ 371 (c)(1),
(2) Date: Jul. 15, 2014

(87) PCT Pub. No.: WO2013/110736
PCT Pub. Date: Aug. 1, 2013

(65) Prior Publication Data
US 2015/0006795 A1    Jan. 1, 2015

(30) Foreign Application Priority Data
Jan. 27, 2012    (DE) .................. 10 2012 201 225

(51) Int. Cl.
*G06F 12/14*    (2006.01)
*G06F 9/455*    (2018.01)
*G06F 12/02*    (2006.01)

(52) U.S. Cl.
CPC ........ *G06F 12/145* (2013.01); *G06F 9/45558* (2013.01); *G06F 12/0246* (2013.01);
(Continued)

(58) Field of Classification Search
CPC ............. G06F 9/45558; G06F 9/45533; G06F 2009/45583; G06F 2212/152;
(Continued)

(56) References Cited

U.S. PATENT DOCUMENTS 7,203,944 B1 *    4/2007    van Rietschote ... G06F 9/45533
                                                                718/1
8,341,624 B1 *    12/2012   Hobbs .................. H04N 19/152
                                                                709/204
(Continued)

FOREIGN PATENT DOCUMENTS

CN    102231138    11/2011
CN    102306126    1/2012

OTHER PUBLICATIONS

Innotek Gmbh "Innotek VirtualBox User Manual Version 1.5.6", Feb. 19, 2008, pp. 1-182.

*Primary Examiner* — Reginald G Bragdon
*Assistant Examiner* — Thanh D Vo
(74) *Attorney, Agent, or Firm* — Cozen O'Connor

(57) ABSTRACT

A computer system includes at least one processor, a first mass memory and a second mass memory. The computer system implements a master operating system core, a first operating system core and at least one second operating system core on the processor under control of the master operating system core. The memory controller provides the master operating system core with defined areas of a mass storage medium as a first mass memory and at least one second mass memory, each independent of one another, and controls mapping of the first mass memory and of the at least (Continued)

one second mass memory to the defined areas of the mass storage medium. The master operating system core allows the first operating system core and the at least one second operating system core to have exclusive access to at least one of the mass memories.

10 Claims, 2 Drawing Sheets

(52) U.S. Cl.
CPC ...... *G06F 12/1475* (2013.01); *G06F 12/1491* (2013.01); *G06F 2009/45579* (2013.01); *G06F 2212/152* (2013.01); *G06F 2212/7211* (2013.01)

(58) Field of Classification Search
CPC .......... G06F 2212/657; G06F 12/1036; G06F 9/5077; G06F 2212/151; G06F 9/45545; G06F 9/455; G06F 9/5016; G06F 9/3004; G06F 9/5011; G06F 11/0712; G06F 8/65; G06F 3/123; G06F 11/1433; G06F 8/656; G06F 11/2033; G06F 11/0724; G06F 11/1438; G06F 11/1441
See application file for complete search history.

(56) References Cited

U.S. PATENT DOCUMENTS

| | | | |
|---|---|---|---|
| 9,342,291 B1* | 5/2016 | Guo | G06F 8/65 |
| 2002/0144010 A1* | 10/2002 | Younis | G06F 9/546 |
| | | | 719/314 |
| 2006/0075199 A1 | 4/2006 | Kallahalla et al. | |
| 2006/0101130 A1* | 5/2006 | Adams | H04L 29/12009 |
| | | | 709/218 |
| 2007/0050767 A1* | 3/2007 | Grobman | G06F 9/45558 |
| | | | 718/1 |
| 2008/0270674 A1 | 10/2008 | Ginzton | |
| 2010/0083247 A1* | 4/2010 | Kanevsky | G06F 13/28 |
| | | | 718/1 |
| 2010/0262752 A1 | 10/2010 | Davis et al. | |
| 2011/0004791 A1* | 1/2011 | Kokubu | G06F 11/0751 |
| | | | 714/57 |

\* cited by examiner

MEMORY CONTROLLER FOR PROVIDING A PLURALITY OF DEFINED AREAS OF A MASS STORAGE MEDIUM AS INDEPENDENT MASS MEMORIES TO A MASTER OPERATING SYSTEM CORE FOR EXCLUSIVE PROVISION TO VIRTUAL MACHINES

CROSS-REFERENCE TO RELATED APPLICATIONS

This is a U.S. national stage of application No. PCT/EP2013/051390, filed on 25 Jan. 2013, which claims priority to the German Application No. 10 2012 201 225.7, filed 27 Jan. 2012, the content of both are incorporated herein by reference.

BACKGROUND OF THE INVENTION

1. Field of the Invention

The invention relates to a computer system that can be used, for example, in a motor vehicle or as embedded system.

2. Related Art

Modern computer systems frequently work with the virtualization of operating systems in order to omit, for example, the use of additional processors or microcontrollers. For security reasons, it is attempted to prevent the mutual access of the virtualized operating systems to one another. In addition, in particular, access of damaging programs to the various virtualized operating systems is to be prevented. If, in the case of a plurality of virtualized operating systems, respective mass memories are stored on the same physical mass storage medium, the risk exists in conventional computer systems, in principle, that unwanted access to external mass memories may take place, for example, by utilization of security gaps. In conventional systems, this is avoided by providing a separate physical mass memory for each virtual operating system.

SUMMARY OF THE INVENTION

One object to be achieved by the present invention consists in specifying an improved concept for the security of virtualized operating systems.

The proposed concept is based on the idea of providing for a computer system a special memory controller for a non-volatile mass storage medium that enables defined areas of the mass storage medium to be accessed in each case as independent mass memory so that in each case at least one of the independent mass memories is provided for, in each case, one virtualized operating system. The memory controller is preferably implemented as a hardware component independent of a processor of the computer system on which the virtualized operating systems are running. This makes it possible to ensure that the virtualized operating systems can, in each case, access only the mass memories assigned to them.

In one embodiment, a computer system has at least one processor and one memory controller for a non-volatile mass storage medium. In this context, the computer system is configured to execute on the processor a master operating system core and a first and at least one second operating system core under the control of the master operating system core. The memory controller is configured to provide to the master operating system core defined areas of a mass storage medium, that is to say a first and at least one second mass memory that are in each case independent of one another, and to control a mapping of the first and of the at least one second mass memory to the defined areas of the mass storage medium. The master operating system core is configured to provide the first and the at least one second operating system core with exclusive access to in each case at least one of the mass memories provided.

The mass storage medium is, for example, a so-called flash memory such as a multimedia card, MMC, or a secure digital memory card, SD card, or the like. For example, the non-volatile mass storage medium is a NAND memory, a NOR memory or a managed NAND memory which in each case can be soldered permanently to the board of the computer system.

In other embodiments, the mass storage medium can also be a hard disk or a solid state drive (SSD). In various embodiments, the mass storage medium is comprised by the computer system and, for example, permanently integrated in the computer system.

The memory controller thus provides the master operating system core with a number of mass memories which, under the control of the master operating system core, are provided as respective mass memories for the first and the at least one second operating system core. In this manner, there can be in each case protected access to the defined areas of the mass storage medium.

In one embodiment, the memory controller has a mapping table in which it has stored a mapping rule on the associated defined areas of the mass storage medium for each mass memory provided. In this manner, the operating systems cores can use the mass memory provided in each case like a conventional mass memory, an implementation or mapping of the access requests of the operating system cores taking place by utilizing the mapping table or the mapping rules, respectively.

For example, the defined areas of the mass storage medium are formed by partitions on the mass storage medium, the stored mapping rules comprising information on a position and size of the partitions.

In this manner, it becomes possible for the operating system cores to access the associated mass memories via, in each case, virtual block numbers to the defined areas, the virtual block numbers defined in this manner being mapped to the physical block numbers of the mass storage medium by the mapping rules. By using the size information of the partitions in the mapping table, it is also possible to ensure that in each case only the defined areas or partitions, respectively, are accessed by the operating system core. For example, it is prevented that in the case of a virtual block number that is too large, there is access to a physical area of the mass storage medium that is not comprised by the defined area.

The memory controller preferably has a master controller configured to control hardware access to the defined areas. In particular, the master controller is configured, for example, to check a respective access authorization to the defined areas. Such an access authorization can be implemented, among other things, via the information stored in the mapping table, for example the position and size information.

In various embodiments, the stored mapping rules also comprise information on a hardware identification number of the respective mass memories. This hardware identification number can be used, for example, by the operating system cores or their drives, respectively, for driving the mass memories.

In various embodiments, the memory controller has a first and at least one second virtual controller, which in each case provide one of the mass memories and in each case have a register mapped into a memory area of the master operating system core. In this manner, at least one virtual controller can be provided for each operating system core controlled by the master operating system core, which virtual controller can be driven directly within the address area of the operating system core. In particular, the mass memories for the controlled operating system cores are driven completely transparently and without knowledge by the other virtual controllers in each case or mass memories, respectively.

The memory controller is implemented preferably as a hardware chip, for instance as application-specific integrated circuit, ASIC, or via a microcontroller having corresponding programming. Program data for such a microcontroller can be stored, for example, in an area of the mass storage medium.

Implementing the memory controller as a hardware chip reduces the computing load on the processor of the computer system. In addition, the separating into different hardware chips between processor and memory controller provides increased security with respect to manipulations of the memory controller by harmful programs running on the processor.

The virtual controllers forward their requests for access to the defined areas, for example, to the master controller that controls the physical access to the mass storage medium. This controlling occurs preferably on the basis of the information stored in the mapping table. Initialization and control of the master controller can take place, for example, by the master operating system core.

In further embodiments, the memory controller is also configured to control access to the defined areas of the mass storage medium based on predetermined priorities. Such controlling takes place, for example, again by the master controller, the predetermined priorities also being stored, for example, in the mapping table.

In further embodiments, the memory controller or the master controller, respectively, is configured to control a wear leveling of the mass storage medium. In this context, so-called wear leveling mechanisms are used that ensure uniform utilization or wear, respectively, of memory areas or memory cells, respectively, of the mass memory medium. In this manner, the computing load of the processor of the computer system can be reduced further.

BRIEF DESCRIPTION OF THE DRAWINGS

In the text which follows, the invention will be explained in greater detail by figures with a plurality of exemplary embodiments. In this context, identical reference symbols identify elements of components of identical function. As far as elements or components correspond to one another in their function, their description will not be repeated in each of the following figures, in which.

DETAILED DESCRIPTION OF THE PRESENTLY PREFERRED EMBODIMENTS

Figure 1:
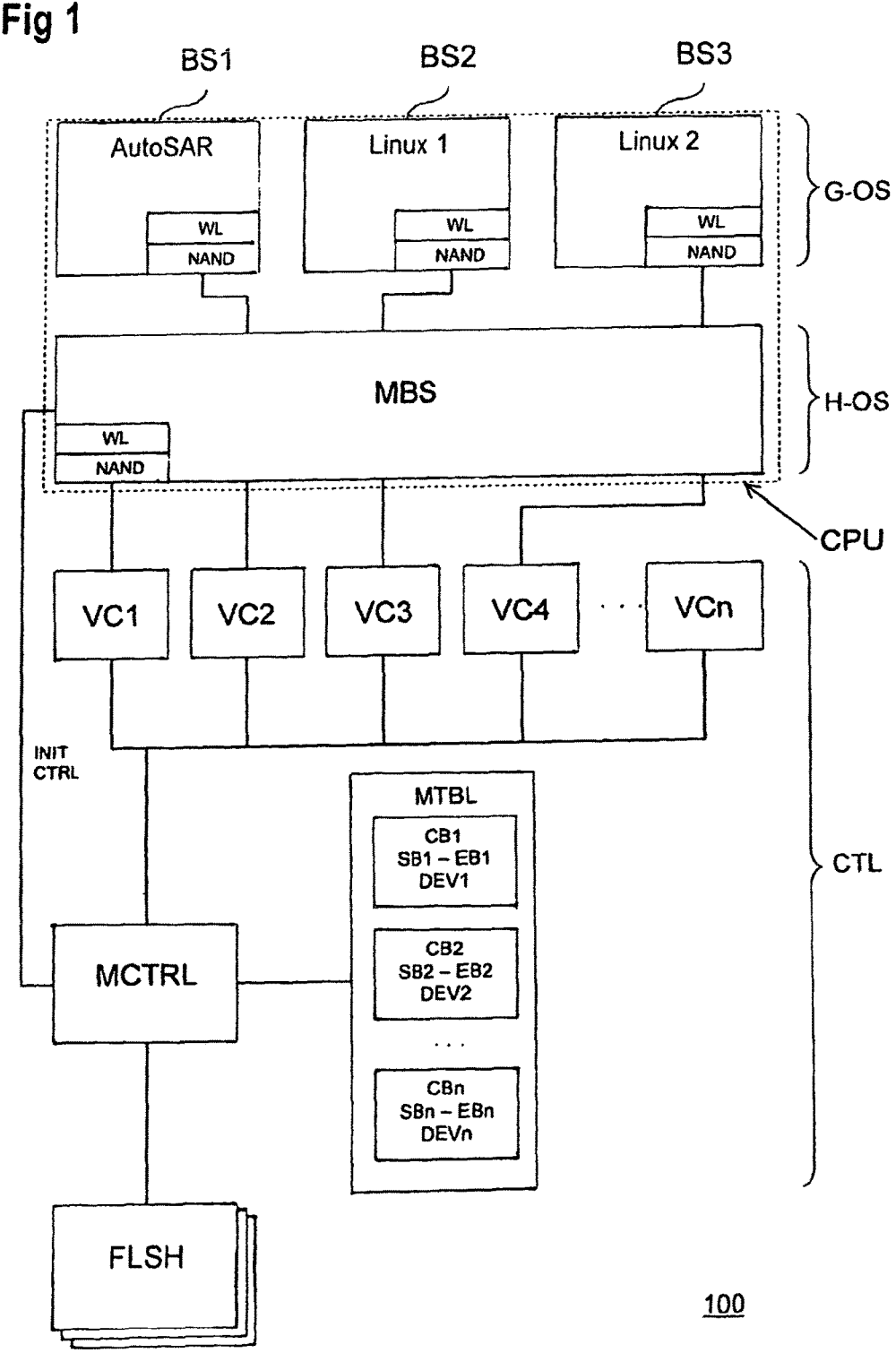
FIG. 1 shows a diagrammatic representation of a computer system.

FIG. 1 shows a diagrammatic representation of an embodiment of a computer system 100 comprising a processor CPU and a memory controller CTL to which a mass storage medium FLSH is connected. The mass storage medium FLSH is, for example, a so-called flash memory such as a multimedia card, MMC or a secure digital memory card, SD card, or the like. For example, the non-volatile mass storage medium FLSH is a NAND memory, a NOR memory or a managed NAND memory which can be soldered permanently to the board of the computer system 100 in each case or even located externally to the computer system 100. The mass storage medium FLSH can also be a solid state drive, SSD.

In the embodiment shown, the processor CPU is used for executing a master operating system core MBS as a so-called host operating system H-OS. Under control of the master operating system core MBS, a first, a second and a third operating system core BS1, BS2, BS3, which represent so-called guest operating systems G-OS, are executed in the present embodiment. For example, the first operating system core BS1 is designed for an operating system according to the Automotive Open System Architecture, AUTOSAR, while various Linux operating systems are running on the second and third operating system core BS2, BS3. For example, the second operating system core BS2 is a conventional Linux operating system that also allows the execution of security-critical applications or programs so that, in particular, the execution of harmful programs cannot be prevented, in principle. The third operating system core BS3 comprises, for example, a secured or hardened Linux system that is operated, for example, with security guidelines and prevents the execution of security-critical applications. For example, an administration of the first and/or the second operating system core BS1, BS2 of their system programs, respectively, takes place by this secured Linux system. The master operating system core MBS is designed, for example, as microcore or separation core.

The memory controller CTL comprises a master controller MCTRL and a plurality of virtual controllers VC1, VC2, VC3, VC4, . . . , VCn, which are connected to the master controller MCTRL. Furthermore, the mass storage medium FLSH is connected to the master controller MCTRL. The memory controller CTL also comprises a mapping table MTBL in which, for each of the virtual controllers VC1 to VCn, a mapping rule is stored between defined areas of the mass storage medium FLSH and the associated virtual controller. For example, there is stored for the first virtual controller VC1 an entry with the identification of the controller CB1, a start block SB1 on the mass storage medium FLSH, an end block EB1 on the mass storage medium FLSH and a hardware identification number DEV1, which are provided to the connected processor CPU by the virtual controller VC1. Similarly, entries with controller information CB2 to CBn, start blocks SB2 to SBn, end blocks EB2 to EBn and hardware identification numbers DEV2 to DEVn are also deposited for the other virtual controllers.

The master controller MCTRL is also connected via a special control line to the processor CPU which, in particular, enables only the master operating system core MBS to control and configure the master controller MCTRL via initialization commands INIT and control commands CTRL.

The memory controller CTL thus provides the master operating system core with a multiplicity of virtual controllers VC1 to VCn which, in turn, are provided to the dependently controlled operating system cores BS1, BS2, BS3 as respectively mass memory controllers. Each operating system core BS1, BS2, BS3 thus obtains at least one separate virtual controller that can be accessed via a mass memory allocated to the operating system core. The memory controller CTL is implemented preferably as a separate hardware chip so that no additional processor power of the processor CPU needs to be used.

For the controlled operating system cores BS1, BS2, BS3, at least, the virtual controllers VC1 to VCn have the functionality of a conventional memory controller, virtual block numbers of the virtual controllers VC1 to VCn being mapped to physical blocks of the connected mass storage medium FLSH by the mapping table. For example, this mapping is implemented by the virtual block number being added to the start blocks SB1, SB2, SBn, which are used as offset. Apart from the pure block numbers, it may be desirable that also the chip select lines are mapped to the virtual controllers VC1 to VCn.

While in the form shown, physical start and end blocks are stored in the mapping table, it is also possible to deposit, apart from the start blocks SB1, SB2, SBn, a partition size on the mass storage medium FLSH in the mapping table in order to define the respective permissible size or the permissible access area, respectively, for the virtual controllers. In both cases, it is provided, for example, that the master controller MCTRL, in the case of an access request of the virtual controllers VC1 to VCn, in the direction of the mass storage medium FLSH, check whether the requested block is located within the area on the mass storage medium defined by the entries. In the case of an area violation which is detected by the master controller MCTRL, it is possible to send, for example, an exception message, in the direction of the processor CPU. This exception message is, for example, a software interrupt, which is then processed by the master operating system core MBS.

A further desirable information is an information about the connected mass storage medium. In this manner, the master controller MCTRL can find out whether the physical memory is connected, for example, via SDIO, MMC or as a pure NAND device. This device information also tells the master controller MCTRL which chips select lines should be used in order to access the mass storage medium and in which way the connected mass storage device is addressed.

In various embodiments, a plurality of mass storage media can also be connected, a plurality of master controllers being preferably provided in this case which in each case implement the physical access to a connected mass storage medium. The information about the type of device of the respective mass storage medium can be meaningful, for example, for a distinction between a plurality of SD cards that are connected to special SD card controllers. The various defined areas for the operating system cores BS1, BS2, BS3 can thus be deposited on different mass storage media. However, it is preferably not provided that a defined area extends over a plurality of mass storage media.

A configuration of the mass storage medium FLSH by the master controller MCTRL is carried out, for example, via the connection, described above, between the master controller MCTRL and the master operating system core MBS. This configuration is performed preferably when starting the master operating system core, the configuration data also being deposited directly on the mass storage medium FLSH, for example in a start area or in the first blocks, respectively, of the mass storage medium FLSH. In this context, the master controller MCTRL is configured preferably for conveying a faulty configuration, for example due to overlapping block areas to the master operating system core MBS or the host operating system H-OS, respectively.

Each virtual controller VC1 to VCn is preferably a real hardware entity with its own registers that are mapped in separate memory sides of the physical address area of the processor CPU. In this manner, each virtual controller can be assigned to a separate partition for a guest operating system using standard mechanisms of the computer system, for example a memory mapping unit, MMU. In addition, each virtual controller VC1 to VCn can have all registers necessary for executing read and write accesses to the virtual device so that each virtual controller acts like a conventional memory controller. A distinction from a conventional memory controller lies, among other things, in the fact that the actual data transmission is physically executed by the master controller MCTRL, which checks the configuration and the mapping table against the transmission or access parameters, respectively, before the transmission is actually carried out.

The transmission or access parameters, respectively, comprise, for example, the block numbers, the number of blocks which are to be read or written, or access authorizations. As a result, the virtual controllers act like independent entities that generate exception messages in the case of access violations. After the master controller has checked the access parameters and the access is thus within the defined and permitted area, the virtual address of the virtual controller is converted into a physical addressed which is used in the mass storage medium FLSH.

Figure 2:
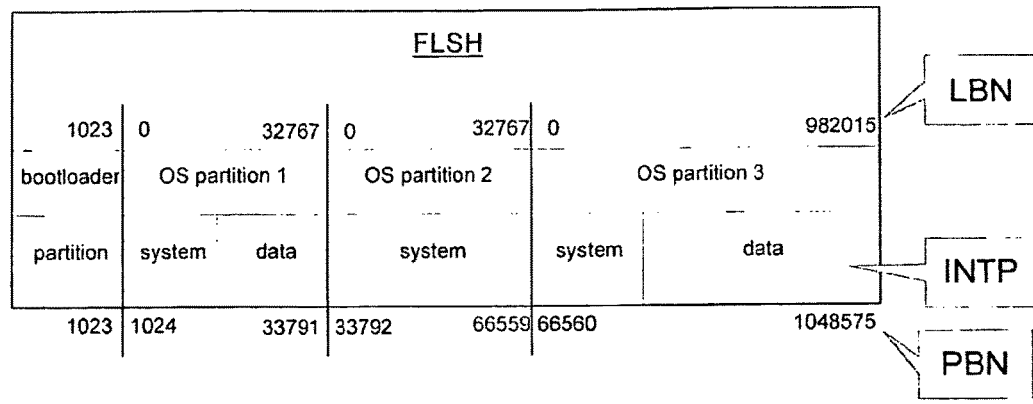
FIG. 2 shows a diagrammatic representation of a division of a mass storage medium.

FIG. 2 shows an exemplary division of a mass storage medium FLSH into a plurality of defined areas that can be accessed via the virtual controllers. In this context, the mass storage medium FLSH, in the exemplary embodiment shown, is divided into four defined areas, which are defined by physical block numbers PBN. For example, the first area goes from a physical block 0 to a physical block 1023, the second area goes from the physical block 1024 to the physical block 33791, the third area goes from the physical block 33792 to the physical block 66559, and the fourth area goes from the physical block 66560 to the physical block 1048575. The first area is, for example, a partition for a boot loader in the case of a start of the entire computer system. The second area is a first operating system partition, which, for the associated operating system, is divided into an internal system partition and an internal data partition. The row with the internal data partitions is identified by INTP. The third area is used as system partition for a second operating system partition and the fourth area is again divided into a system partition and a data partition as internal data partitions of a third operating system partition. The respective areas result in logical block numbers LBN, which in each case begin at 0 and end at block 1023 for the first area, at block 32767 for the second area and block 32767 for the third area and at block 982015 for the fourth area.

The individual areas can also be called super partitions. As a result, the associated super partition looks like a complete mass memory for each operating system core. In this area of the super partition, a first block, for example, is again used like a so-called master boot record, which is similarly used in conventional PC systems. For example, a partition table that carries information about the internal partitions INTP is stored in this master boot record.

Each operating system core has access to its associated super partition and can administer access rights to the internal partitions INTP. For the operating system cores BS1, BS2, BS3, which are designed to be dependent, however, access to an internal partition is possible only with the rights which are assigned which are by the master operating system core MBS. Accordingly, an operating system core that only has read access to the OS partition 2, can only access the memory of this partition to read. Correspondingly, this operating system core can also not generate its own partitions or write or have written contents to the mass storage medium. Similarly, it can also be possible that another operating system core only has read access to the system partition of the OS partition 3, while read and write accesses to the internal data partition of the OS partition 3 are possible. Each super partition is administered preferably at a virtual controller. In various embodiments, it is also possible that a plurality of virtual controllers have access to the same physical area in order to provide a physical area also to a plurality of operating system cores in a secure manner. For example, this provides for write and read access to the associated super partition for a virtual controller whereas the other virtual controller or controllers only have read accesses to this area.

Booting of the computer system is always carried out preferably from the first blocks of the connected mass storage medium FLSH. After a switch-on, it is desirable that the mapping table is filled with zeros so that all virtual controllers see the entire connected storage area of the mass storage medium FLSH. As a rule, this is possible without problem since the processor is usually started by a so-called boot loader or the master operating system core by a so-called bootstrapping process. This boot loader then preferably initializes the mapping table MTBL before the dependently controlled operating system cores BS1, BS3 are started.

For this purpose, various possibilities are provided. For example, it is possible that an initialization code writes the start and end blocks explicitly into the mapping table MTBL. It is also possible that the mapping table is initialized by a special block in the mass storage medium FLSH. The initialization code preferably also ensures that access to the master controller MCTRL is restricted to the master operating system core MBS. In addition, the initialization code preferably initializes fundamental MMU tables so that the virtual controllers can be assigned in the corresponding master operating system core or to the guest operating system cores BS1, BS2, BS3, respectively.

In various embodiments, an interoperability with an input/output MMU can also be provided so that additionally memory area identification, translation buffers or references to MMU translation buffers are written into a register of the virtual controller. When an input/output MMU is used, it should be capable of mapping and intercepting interrupt requests of the virtual controllers. In this context, the master controller stimulates preferably the interrupt requests for the virtual controllers for which a fundamental transmission has been carried out. The input/output MMU needs for this purpose an allocation with memory areas, for example a guest partition or the master operating system core, which is generated by the configuration of the virtual controllers, in order to check DMA transmissions and map interrupt requests. Accordingly, it is desirable that the input/output MMU manages without intercepting interrupt requests from the master controller to the virtual controllers. Even if a mass storage medium is used only as a partition, it is sufficient that the input/output MMU works only with one virtual controller. In this case, it is desirable that this is the first controller, which is configured for access to all memory areas of the mass storage medium.

Furthermore, it may be desirable that the computer system is configured for a prioritization of accesses. Access priorities are features, not to be neglected, for complex systems such as for example in the case of an entertainment system in a vehicle. The reason for this is that usually requirements are given that the last user setting is stored within a short time of, for example, 1 or 2 milliseconds if a voltage drop and a switch-off of the computer system threatens or is initiated. During this time, it should be guaranteed that the existing data are deposited on the mass storage medium and physically stored. To provide for this, the computer system should be capable of writing one or more blocks onto the mass storage medium within a short time and, in this manner, bypass or, respectively, even terminate other requests of other virtual controllers. This can be implemented, for example, in that a priority is assigned for each virtual controller. As a standard, it is possible to use, for example, an identification of the virtual controller as an initial priority.

In a development, it is possible, for example, to assign respective priorities to the virtual controllers during an initialization process. In addition, it may be possible that the memory controller CTL controls the access for virtual controllers with identical priority in a round robin process. The master controller has preferably a list in which transmissions to be processed, that is to say memories or read processes are stored on the mass storage medium and brought into a sequence. For this purpose, it may be appropriate that the master controller is provided with a special memory or memory areas from existing memories.

A further possible property of the computer system is the processing of exception messages. All exception messages are forwarded preferably into a privileged mode. The master operating system core MBS should always be started with complete privileges while the guest operating systems BS1, BS2, BS3 operate with lower privileges. Processors that support the virtualizations in the case of embedded systems are, among other things, for example, the ARM Cortex A15 and the Intel Atom processor. Interrupt requests, by which exception messages such as access violations are reported, are forwarded preferably directly to the master operating system core MBS, similarly for the input/output MMU. The master operating system core MBS can then select a corresponding defense mechanism, which can extend from ignoring the event up to stopping or restarting the guest operating system. Such exception messages are forwarded to the master operating system core preferably via the master controller MCTRL.

In various embodiments, it is possible that a configuration of the memory controller CTL is possible also during the operation of the computer system by the master operating system core or by the host operating system H-OS respectively. This facilitates software updating methods. Thus, it is possible, for example, that the privileged partition of the mass storage medium updates the installed programs of the host operating system H-OS or of the master operating system core MBS, respectively, and the guest operating system cores BS1, BS2, BS3. During an updating process, the guest operating system cores BS1, BS2, BS3 are stopped, for example, or stopped in their run coordination, respectively, in order to avoid race conditions during access to the file system.

Depending on the technology used, it may be necessary that wear leveling is performed, either implemented as software or implemented directly in the connected mass storage medium. In the case where the wear leveling is executed directly by the mass storage medium, the host operating system H-OS and the guest operating systems BS1, BS2, BS3 can omit the use of wear leveling and thus not operate directly with the physical blocks on the mass storage medium, especially a flash memory. Instead, it is sufficient that the blocks, previously designated as physical blocks, again serve as logical or virtual blocks that are converted directly by the mass storage medium into the actual physical blocks. In other words, an additional logical level of blocks is introduced between memory controller CTL and mass storage medium FLSH.

Since in the wear leveling, blocks are arranged physically distributed on the mass storage medium, it is necessary to ensure that a block is deleted before it is allocated to a new virtual block in order to prevent possible safety holes. If the mass storage medium FLSH does not have its own controller for carrying out the wear leveling, it is appropriate that the master operating system core MBS and the operating system cores BS1, BS2, BS3 executed in a controlled manner in each case have implemented their own wear leveling algorithms, which is shown in FIG. 1 by the blocks designated by WL and NAND. In particular in conjunction with the application of access priorities that was described before, the demands on wear leveling are additionally increased. The reason for this is, among other things, that, for example in the case of a managed NAND memory, the corresponding controller is busy with the wear leveling while a virtual controller of the computer system sends a request for writing a block with high priority. To guarantee in this case that, for example, the last user mode data can be written, it may be necessary to connect a second mass memory with a different chip select so that transactions with high priority can be processed independently of internal sequences in the managed NAND memory.

A further point is an optimized access to the mass storage medium. The input/output bandwidth of an access to a flash memory depends essentially on an internal organization in a chip of the flash memory.

For example, an efficient access is implemented at one manufacturer by using even and odd block numbers alternately whereas, at another manufacturer, the first and the second halves of block numbers are utilized alternately. In each case, this essentially depends on which addresses are used for the selection of a logical unit.

An omitting access can be programmed, for example, by bringing read, write or delete commands into one sequence. By sequencing the requests in a manner that is most advantageous for the hardware device used, addressing times can be minimized as a result of which distinctly higher throughput rates can be achieved.

To obtain a good operating time characteristic for the system, it is advantageous if optimization of such accesses remains possible. A full throughput may require more than one address area per virtual controller, especially because of the omission schemes for the access, described before. To achieve this, it is advantageous to provide a separate programmable processor as memory controller in order to achieve address checking, implementation, wear leveling and optimized access. Such a processor for the memory controller can also serve as DMA master for transmission of storage to the assigned memory blocks of the operating system cores MBS, BS1, BS2, BS3. For example, a controller processor, in turn, can be initialized itself by a connected mass storage medium, especially a flash memory.

The creation of secure flash partitioning depends not only on the implementation of virtual controllers. Since the memory access to the flash memory profits from the DMA operation, it may also be necessary to protect the DMA transmissions.

For example, this is done via an input/output MMU which ensures that a guest operating system BS1, BS2, BS3 or a virtual controller carries out an actual storage transmission only when there are sufficient access rights present. In the case of an access violation, the input/output MMU can trigger an exception message, for example an interrupt request to the master operating system core MBS so that the master operating system core MBS eliminates the error by deactivating or restarting the guest operating system core which has triggered the error.

Figure 3:
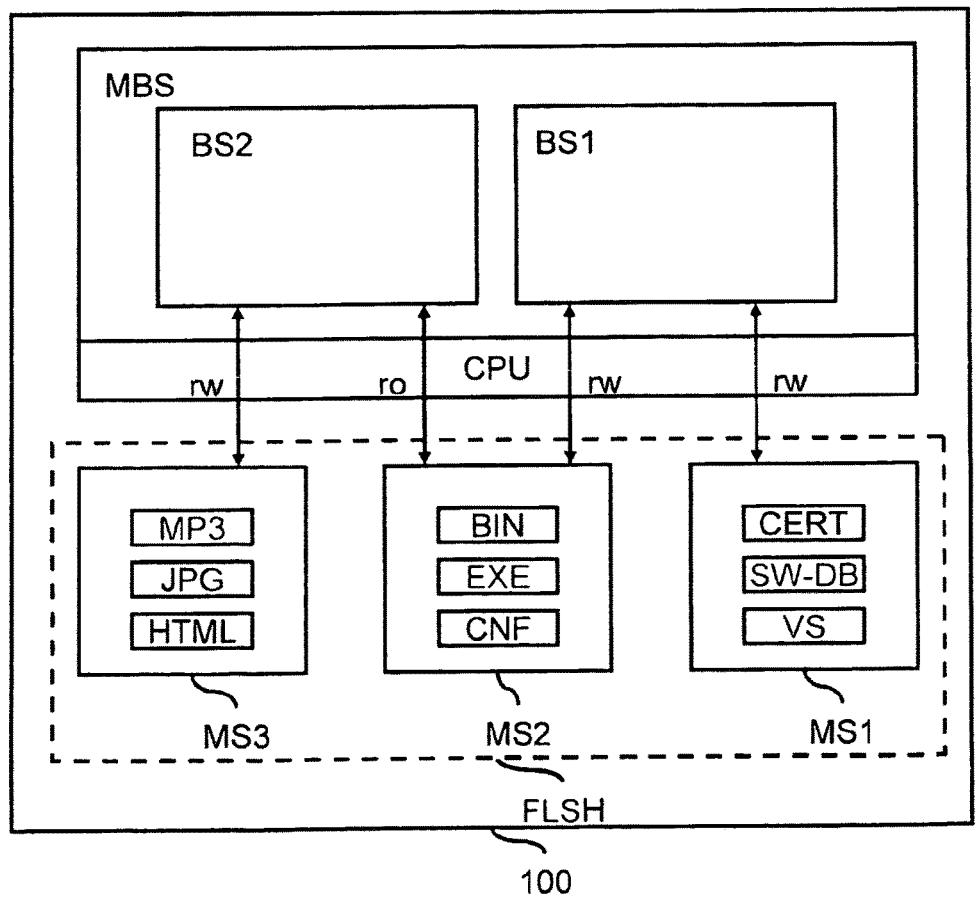
FIG. 3 shows a diagrammatic representation of a further exemplary embodiment of a computer system.

FIG. 3 shows a possible application for the principle described above, by an exemplary diagrammatic representation of a computer system 100. In the embodiment shown, three partitions or, respectively, mass memories MS1, MS2, MS3 are set up, for example, on the mass storage medium FLSH. On the processor CPU, the master operating system core MBS is running, which controls two separately operable operating system cores BS1, BS2.

The left operating system core BS2 is used for executing a conventional operating system that enables Internet applications to be used for a web browser, downloadable applications and multimedia functionality. The operating system core BS2 is preferably protected, there not being any necessity for providing increased reliability. Operating system files, applications, library files and configuration files are deposited for the second operating system core BS2 with the second mass memory MS2. For this purpose, the second mass memory MS2 has, for example, storage space for system files BIN, executable files EXE and configuration files CNF. The master operating system core MBS or the memory controller CTL, not shown here, ensures that the second operating system core BS2 only has read access to the second mass memory MS2 but no write access, characterized by RO (read only). User files such as music files MP3, image files JPG or other Internet formats HTML are set up on the third mass memory MS3 to which the second operating system core BS2 has both read access and write access. This is identified by the designation RW (read-write).

The right operating system core BS1 is used for executing a secure operating system under which a software management program is running. Furthermore, a virus scanner and/or certain security guidelines can also be implemented under the first operating system core BS1. Access to the first operating system core is provided preferably only for maintenance purposes so that, in particular, no unsafe multimedia applications or the like can be executed. The first operating system core BS1 has write access and read access to the first and the second mass memory MS1, MS2. On the first mass memory MS1, a database for software management SW-DB, safety certificates ZERT and a virus scanner VS are stored. Operating system files, applications, library files and configuration files are deposited for the first operating system core BS1 either also on the second mass memory MS2 or preferably on the first mass memory MS1. The second operating system core BS2 has no access whatever to the first mass memory MS1 and has preferably also no knowledge of the existence of this mass memory MS1. The access to the mass memory medium FLSH or, respectively, the mass memory MS1, MS2, MD3 is controlled by the master operating system core MBS or, respectively, the memory controller CTL.

For a software updating of the second operating system core, the first operating system core BS1 is correspondingly used that performs an updating of the system files in applications on the second mass memory MS2 on the basis of the database for the software management. For this purpose, the first operating system core BS1 has access to the second mass memory MS2 via a separate virtual controller.

In particular, two separate virtual controllers simultaneously access the second mass memory MS2 while the virtual controller only allows read access to the second operating system core BS2 whereas the virtual controller of the first operating system core BS1 also provides for a write access. Access of the second operating system core BS2 to the mass memory of the first operating system core BS1 is prevented, however.

The embodiment of the computer system shown enables the change of system files and thus the selected opening of further security gaps coming from the second operating system core BS2 to be prevented even when the second operating system core BS2 is compromised by a harmful program. This is because, due to the Internet capability and multimedia capability of the second operating system core there is the risk in principle that due to unrecognized or newly occurring security gaps in the system, harmful programs can be introduced into the area of the second operating system core which, however, due to the lack of write authorization, cannot lead to a permanent change of the operating system under the second operating system core BS2. This has the effect that harmful programs cannot remain in the computer system when the system is switched off and switched on again.

In particular, the computer system 100 is configured for operation in a motor vehicle. For example, the computer system 100 is designed as embedded system. However, the computer system 100 can also be used in other environments such as, e.g., in mobile telephones such as, for example, operated with the Android operating system.

Thus, while there have been shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A computer system (100) comprising:
at least one processor (CPU);
a non-volatile mass storage medium (FLSH); and
one memory controller (CTL) for the non-volatile mass storage medium (FLSH), wherein:
the computer system is configured to execute on the processor (CPU) a master operating system core (MBS) and a first and at least one second operating system core (BS1, BS2) under the control of the master operating system core (MBS),
the memory controller (CTL) is configured as a hardware component separate and independent from the processor (CPU) of the computer system, the memory controller (CTL) being configured to:
provide to the master operating system core (MBS) defined areas of the non-volatile mass storage medium (FLSH) as a first and at least one second mass memory, which are in each case independent of one another,
provide wear leveling of the non-volatile mass storage medium to ensure uniform utilization, and
to control a mapping of the first and of the at least one second mass memory to the defined areas of the non-volatile mass storage medium (FLSH), and
wherein only the master operating system core (MBS) is configured to provide the first and the at least one second operating system core (BS1, BS2) with exclusive access to a respective at least one of the first and at least one second mass memory,
wherein only the at least one second operating system core (BS1, BS2) can only access the provided at least one of the first and at least one second mass memory, and
wherein the at least one second operating system core (BS1, BS2) cannot define areas of the non-volatile mass storage medium (FLSH),
wherein the first and the at least one second operating system core (BS1, BS2) are stopped during an updating process in a privileged partition to update installed programs of a host operating system (H-OS) or of the master operating system core (MBS), respectively.

2. The computer system (100) as claimed in claim 1, wherein the memory controller (CTL) has a mapping table (MTBL) in which a mapping rule is stored on the associated defined areas of the non-volatile mass storage medium (FLSH) for each of the first and at least one second mass memory.

3. The computer system (100) as claimed in claim 2, wherein the defined areas of the non-volatile mass storage medium (FLSH) are formed by partitions on the non-volatile mass storage medium (FLSH) and wherein the stored mapping rules comprise information as to a position and size of the partitions.

4. The computer system (100) as claimed in claim 2, wherein the stored mapping rules comprise information relating to a hardware identification number of the first and at least one second mass memory.

5. The computer system (100) as claimed in claim 1, wherein the memory controller (CTL) has a master controller (MCTRL) configured to control hardware access to the defined areas.

6. The computer system (100) as claimed in claim 5, wherein the master controller (MCTRL) is configured to check a respective access authorization to the defined areas.

7. The computer system (100) as claimed in claim 1, wherein the memory controller (CTL) has a first and at least one second virtual controller (VC1, VC2, . . . , VCn) which in each case provide one of the first and at least one second mass memory and in each case have a register mapped into a memory area of the master operating system core (MBS).

8. The computer system (100) as claimed in claim 1, wherein the memory controller (CTL) is configured to control access to the defined areas of the non-volatile mass storage medium (FLSH) based on predetermined priorities.

9. The computer system (100) as claimed in claim 1, wherein the memory controller (CTL) is configured to control a wear leveling of the non-volatile mass storage medium (FLSH).

10. The computer system (100) as claimed in claim 1, wherein the memory controller (CTL) is further configured to:
receive requests to access defined areas based on the mapping table, and
be initialized by the master operating system core (MBS).

* * * * *